US011225296B1

(12) United States Patent
Gu

(10) Patent No.: US 11,225,296 B1
(45) Date of Patent: Jan. 18, 2022

(54) WALL MOUNTED BICYCLE RACK

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

(*) Notice: Subject to any disclaimer, the term of this patent is extended or adjusted under 35 U.S.C. 154(b) by 0 days.

(21) Appl. No.: 17/192,888

(22) Filed: Mar. 5, 2021

(51) Int. Cl.
*B62H 3/12* (2006.01)
*B62H 3/08* (2006.01)

(52) U.S. Cl.
CPC .............. *B62H 3/12* (2013.01); *B62H 3/08* (2013.01)

(58) Field of Classification Search
CPC ... B62H 3/00; B62H 3/04; B62H 3/06; B62H 3/08; B62H 3/12; A47F 7/04; Y10T 70/5876; Y10T 70/5881
See application file for complete search history.

(56) References Cited

U.S. PATENT DOCUMENTS

| | | | |
|---|---|---|---|
| 570,465 A * | 11/1896 | Dilley et al. | B62H 3/12 211/19 |
| 572,770 A * | 12/1896 | Putnam | B62H 3/12 211/19 |
| 619,344 A * | 2/1899 | Pyott, Jr. | B62H 3/12 211/18 |
| 639,517 A * | 12/1899 | Butcher | B62H 5/00 211/5 |
| 679,794 A * | 8/1901 | Sweet | B62H 3/12 211/19 |
| 764,774 A * | 7/1904 | Sargeant | B62H 3/12 211/18 |
| 5,996,814 A * | 12/1999 | Workman | B25H 1/0014 211/22 |
| 6,588,603 B1 * | 7/2003 | West | B62H 3/04 211/19 |
| 9,056,640 B2 * | 6/2015 | Vineyard | B62H 3/06 |
| 9,440,694 B2 * | 9/2016 | Hudson, Jr | B62H 3/12 |
| 11,046,381 B1 * | 6/2021 | Gu | B62H 3/12 |
| 2013/0270201 A1 * | 10/2013 | Vineyard | B62H 3/06 211/21 |
| 2016/0280296 A1 * | 9/2016 | Greenblatt | B62H 3/02 |

* cited by examiner

*Primary Examiner* — Ko H Chan

(57) ABSTRACT

A wall mounted bicycle rack includes a base with an axle pivotably connected between two lugs extending from a board of the base. The axle includes a portion including a first end and a second end. A hook unit is adjustably connected to the first end or the second end of the portion of the axle so as to set the entrance toward the left side of the right side of the base. The bicycle is able to be hooked to the arm of the hook unit from left side or the right side according to practical need. A contact plate is connected to the axle and located between the first end and the second end so that the bicycle wheel contacts against the contact plate.

8 Claims, 10 Drawing Sheets

WALL MOUNTED BICYCLE RACK

BACKGROUND OF THE INVENTION

1. Fields of the Invention

The present invention relates to a wall mounted bicycle rack to which a bicycle can be positioned from left or right side of the rack.

2. Descriptions of Related Art

There are multiple types of bicycle racks for positioning bicycles indoor, some are known to applicant such as floor-standing racks (Taiwanese Utility Model M593355, M568806, M567723; U.S. Ser. No. 10/252,759B2, U.S. Ser. No. 10/618,582B1), wall mounted horizontal racks (Taiwanese Utility Model M563990; U.S. Ser. No. 10/822,045B1) or wall mounted vertical racks (Taiwanese Utility Model M439605). It is noted that, the wall mounted vertical racks are easily installed, and require less space.

The aforementioned Taiwanese Utility Model M439605 is usually installed in the corner of the wall of a garage to save space. The entrance for the bicycle is on the right side of the rack, so the bicycle can only be positioned from the right side of the rack. Therefore, the wall mounted rack cannot be installed in the corner wherein a wall is located on the right side of the rack, because the wall restricts the entrance of the bicycle from the right side.

The present invention intends to provide a wall mounted bicycle rack to eliminate shortcomings mentioned above.

SUMMARY OF THE INVENTION

The present invention relates to a wall mounted bicycle rack and comprises a base having an axle pivotably connected thereto. The axle includes a portion which includes a first end and a second end that is located opposite to the first end. The first end including a first pivot extending therefrom, and the second end includes a second pivot extending therefrom. A hook unit includes a shank and an arm. The shank includes a passage defined in the first end thereof so as to be connected to the first pivot or the second pivot. The arm extends laterally from the second end of the shank so that an entrance is formed between the arm and the shank. The entrance is opened toward the left side or the right side of the base so that a bicycle can access the arm from the left side or the right side of the base. A contact plate is connected to the axle and located between the first end and the second end such that the bicycle wheel is positioned on the contact plate.

The primary object of the present invention is to provide a wall mounted bicycle rack wherein the hook unit is adjustable to change the entrance so that a bicycle can access the arm from the left side or the right side of the base.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
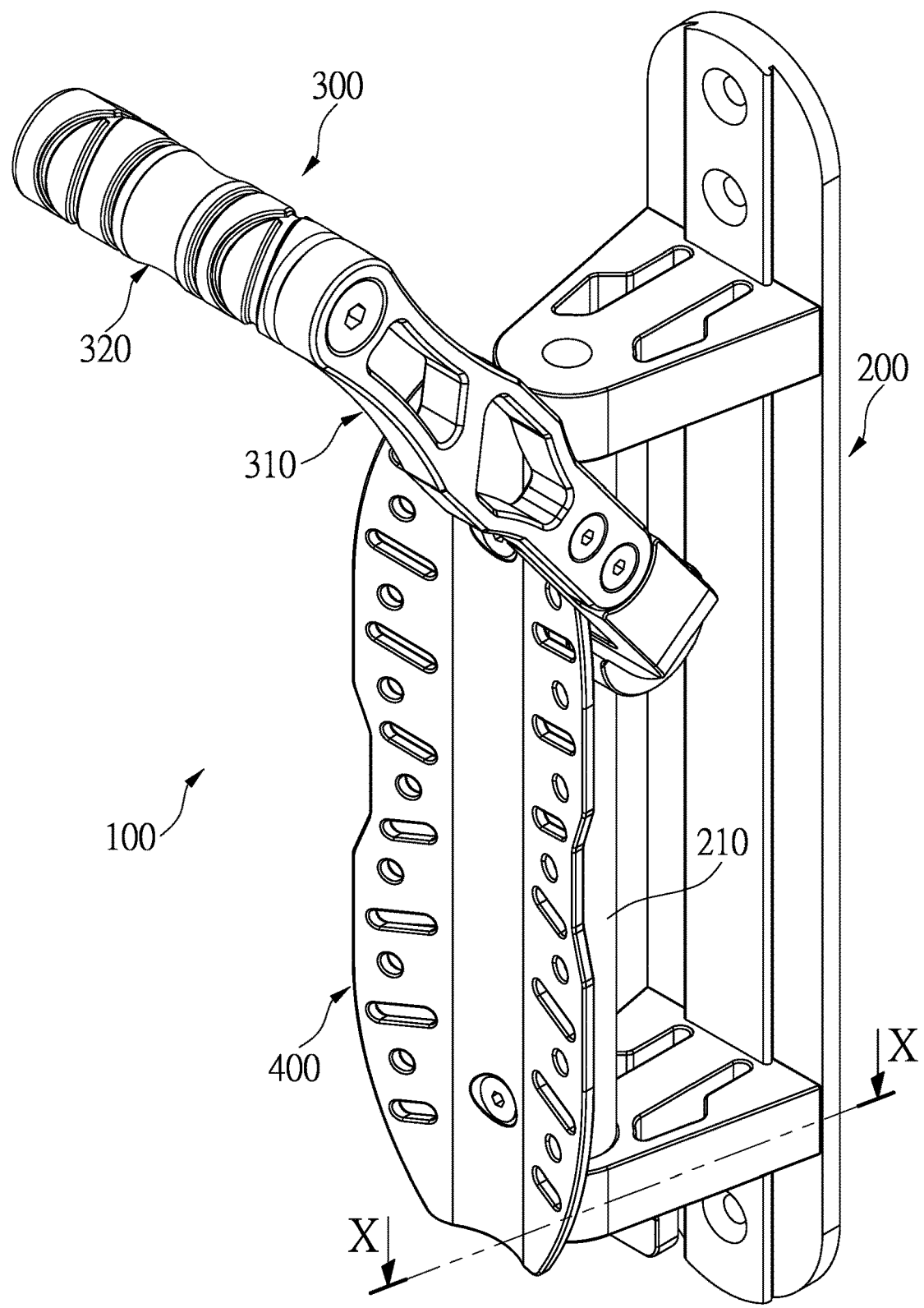
FIG. 1 is a perspective view to show the wall mounted bicycle rack of the present invention.
Figure 2:
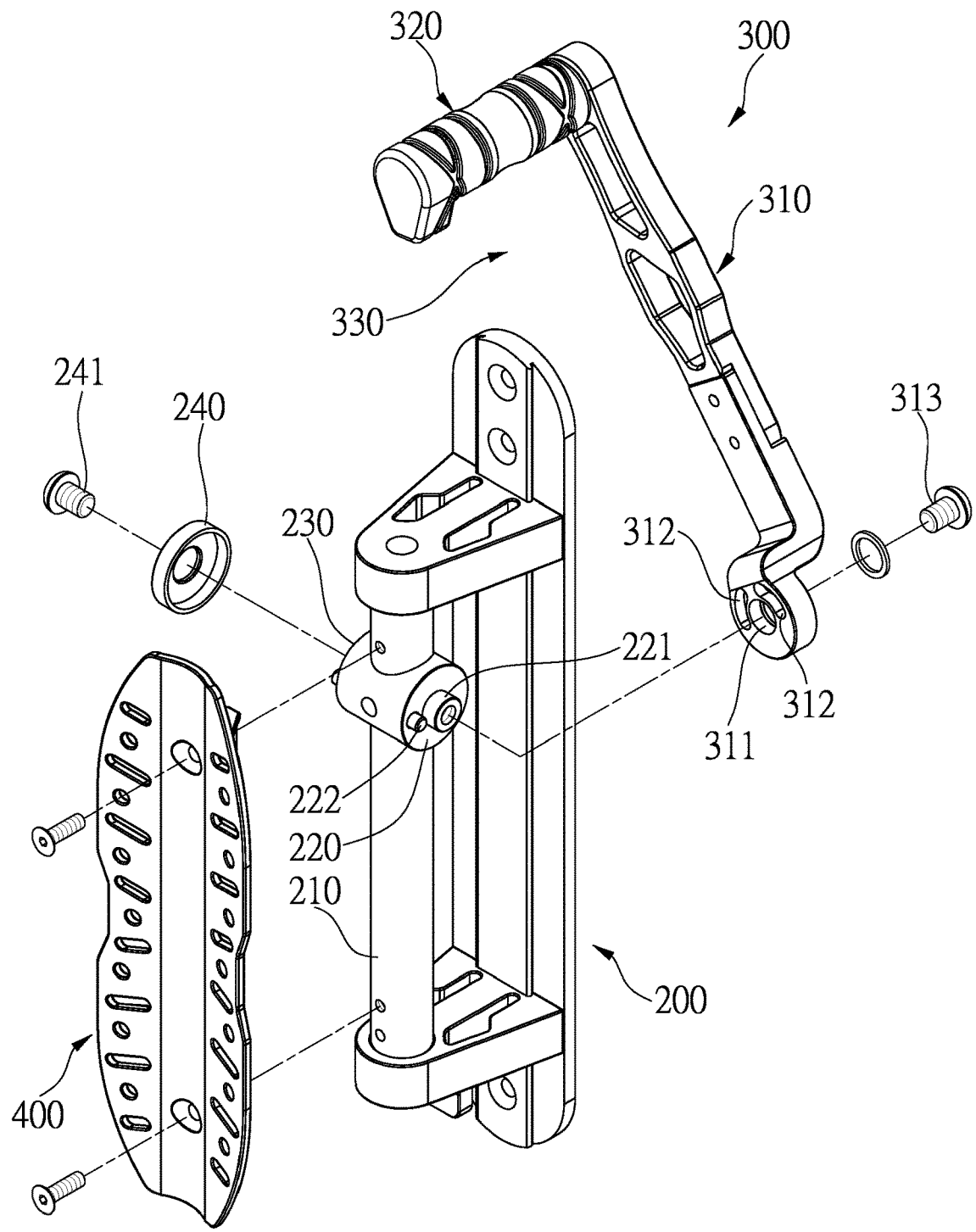
FIG. 2 is an exploded view of the wall mounted bicycle rack of the present invention.
Figure 3:
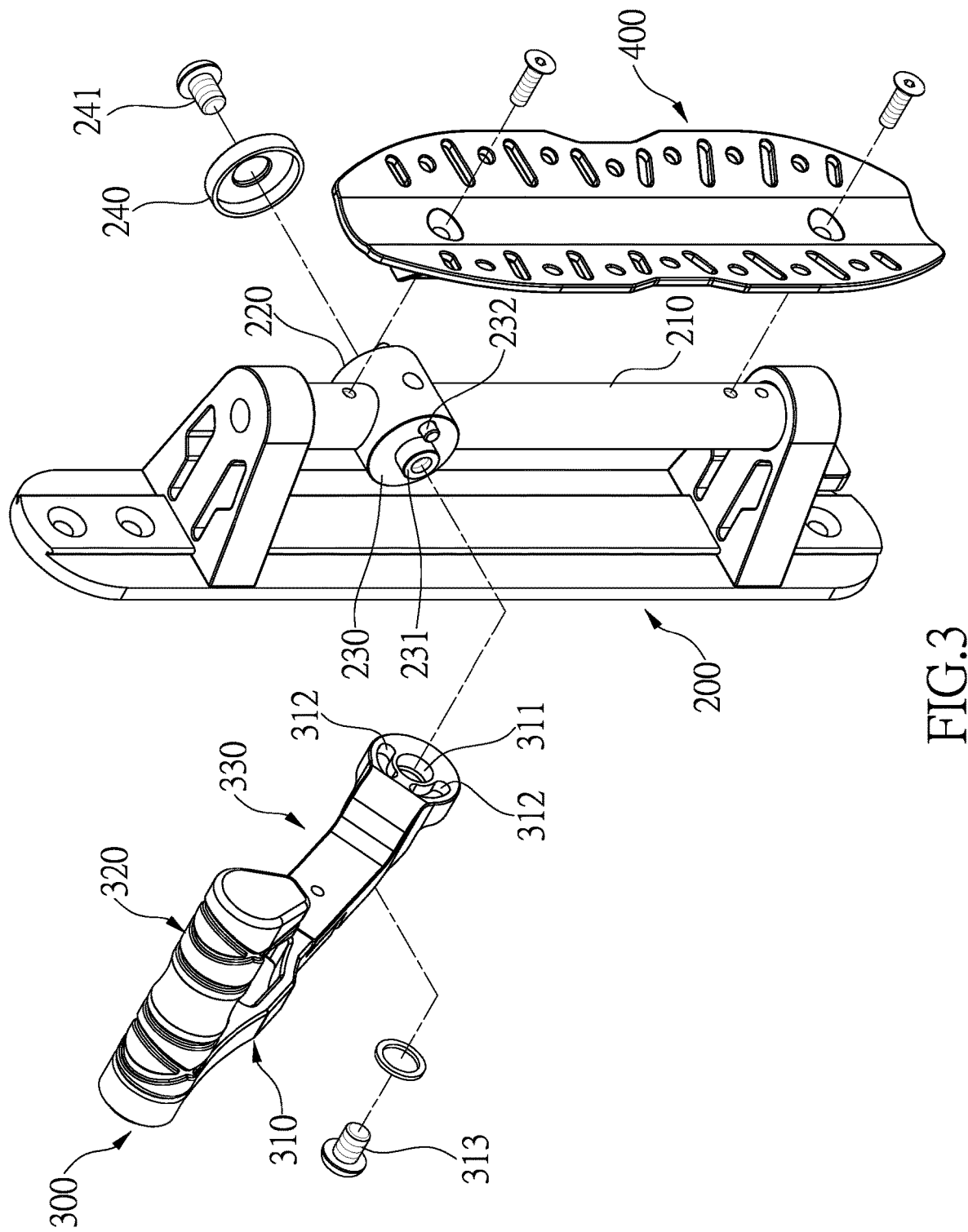
FIG. 3 shows that the hook unit is to be connected to the first end of the portion of the axle.

Referring to FIGS. 1 to 3, the wall mounted bicycle rack 100 of the present invention comprises a base 200 having an axle 210 pivotably connected thereto. The axle 210 includes a tubular portion that is attached transversely to the axle 210 and includes a first end 220 and a second end 230 that is located opposite to the first end 220. The first end 220 includes a first pivot 221 extending centrally therefrom, and the second end 230 includes a second pivot 231 extending centrally therefrom. A hook unit 300 includes a shank 310 and an arm 320. The shank 310 includes a passage 311 defined in the first end thereof so as to be connected to the first pivot 221 or the second pivot 231. The arm 320 extends laterally or perpendicularly from the second end of the shank 310 so that an entrance 330 is formed between the arm 310 and the shank 310. The entrance 330 is opened toward the left side or the right side of the base 200. A contact plate 400 is connected to the axle 210 and located between the first end 220 and the second end 230.

The users can install the hook unit 300 to the first pivot 221 or the second pivot 231 according to the needs so as to have the entrance 330 be opened toward the left side of the right side of the base 200. Therefore, the bicycle can access the arm 320 of the hook unit 300 from left side or right side of base 200 as needed. The front wheel contacts the contact plate 400 to position the bicycle to the wall with the bicycle rack 100 of the present invention. The present invention can be installed to a corner of the wall without worry of the wall located on the left side or the right side of the bicycle rack 100.

Figure 4:
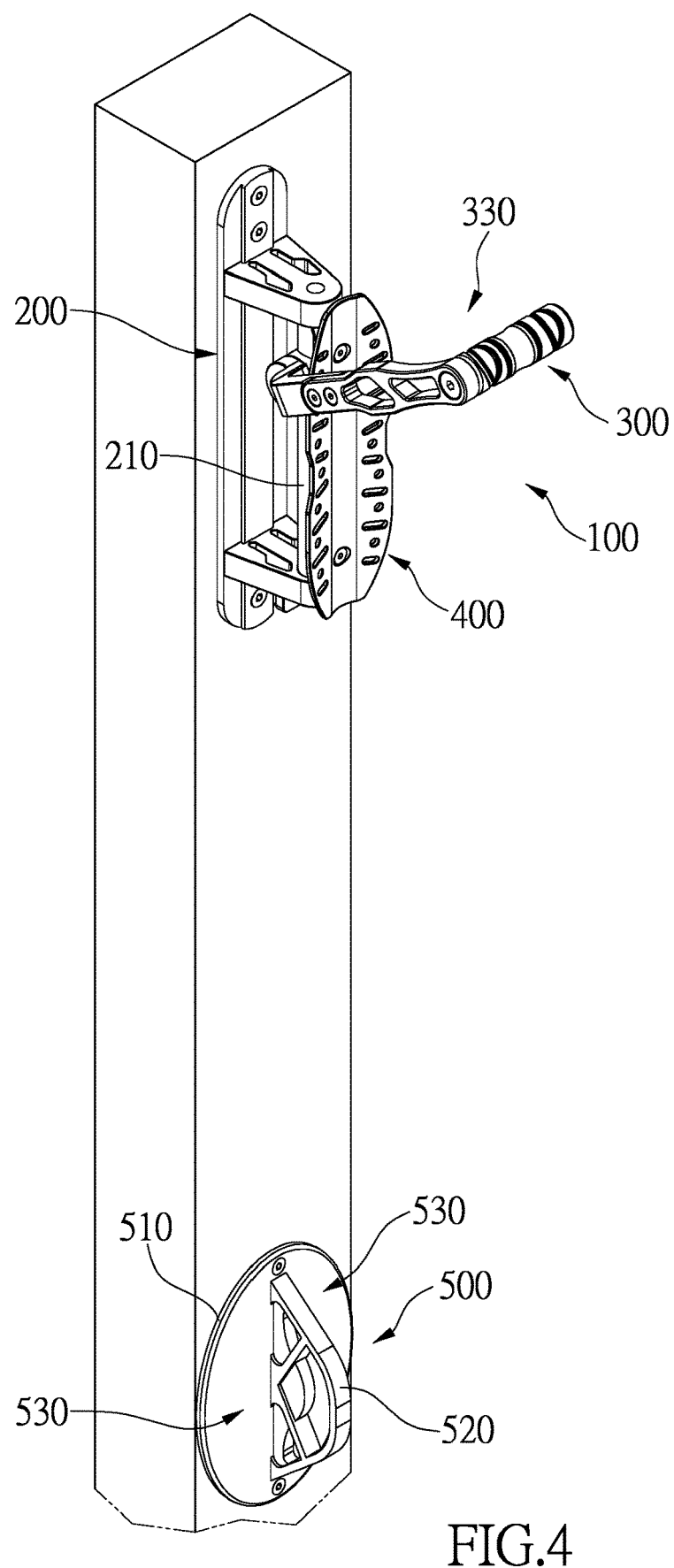
FIG. 4 is a perspective view to show the wall mounted bicycle rack of the present invention, wherein a stop unit is cooperated with the wall mounted bicycle rack.
Figure 5:
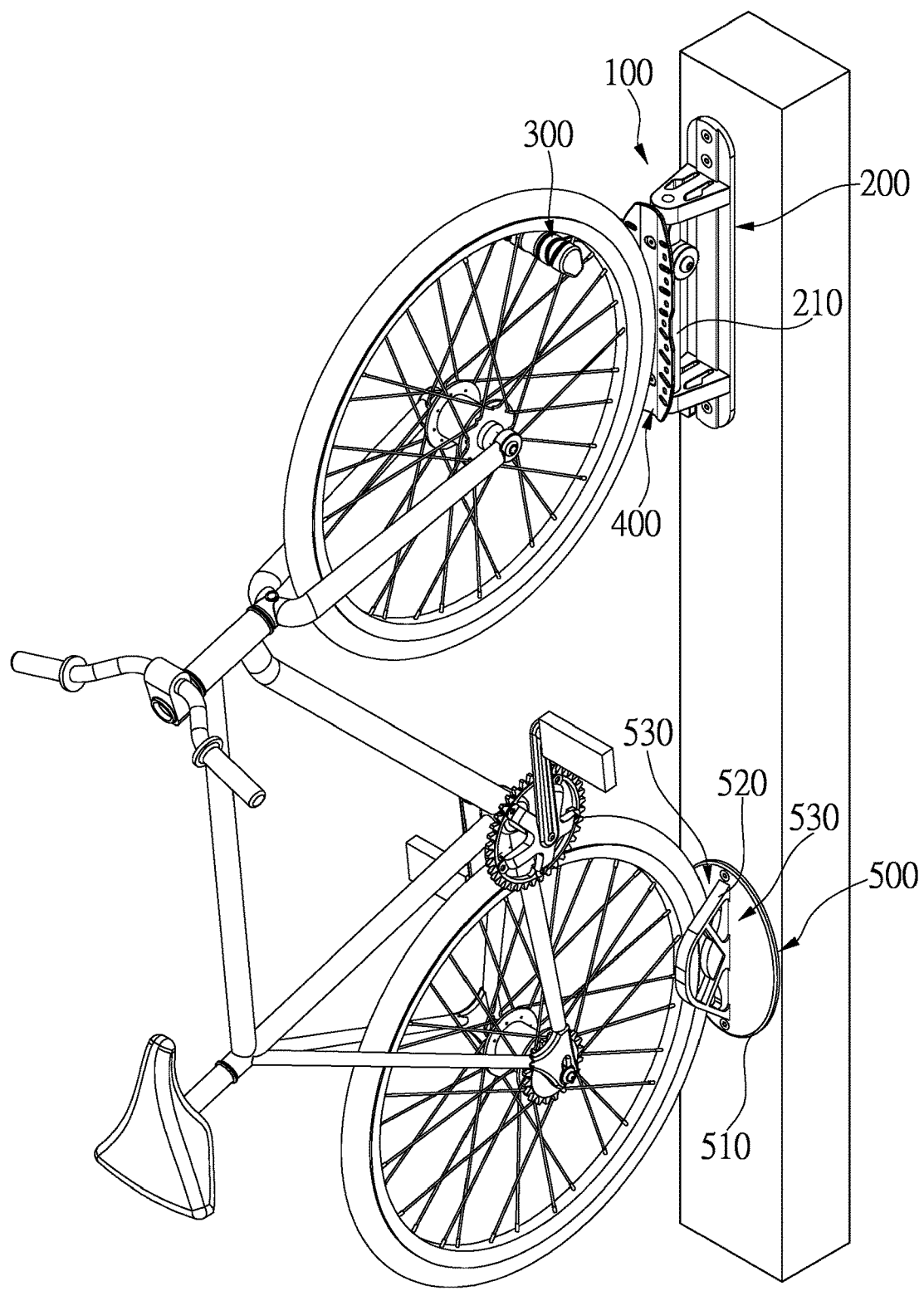
FIG. 5 shows a bicycle is positioned to the wall mounted bicycle rack of the present invention, wherein the front wheel contacts the contact plate and the rear wheel is stopped by the stop unit.
Figure 6:
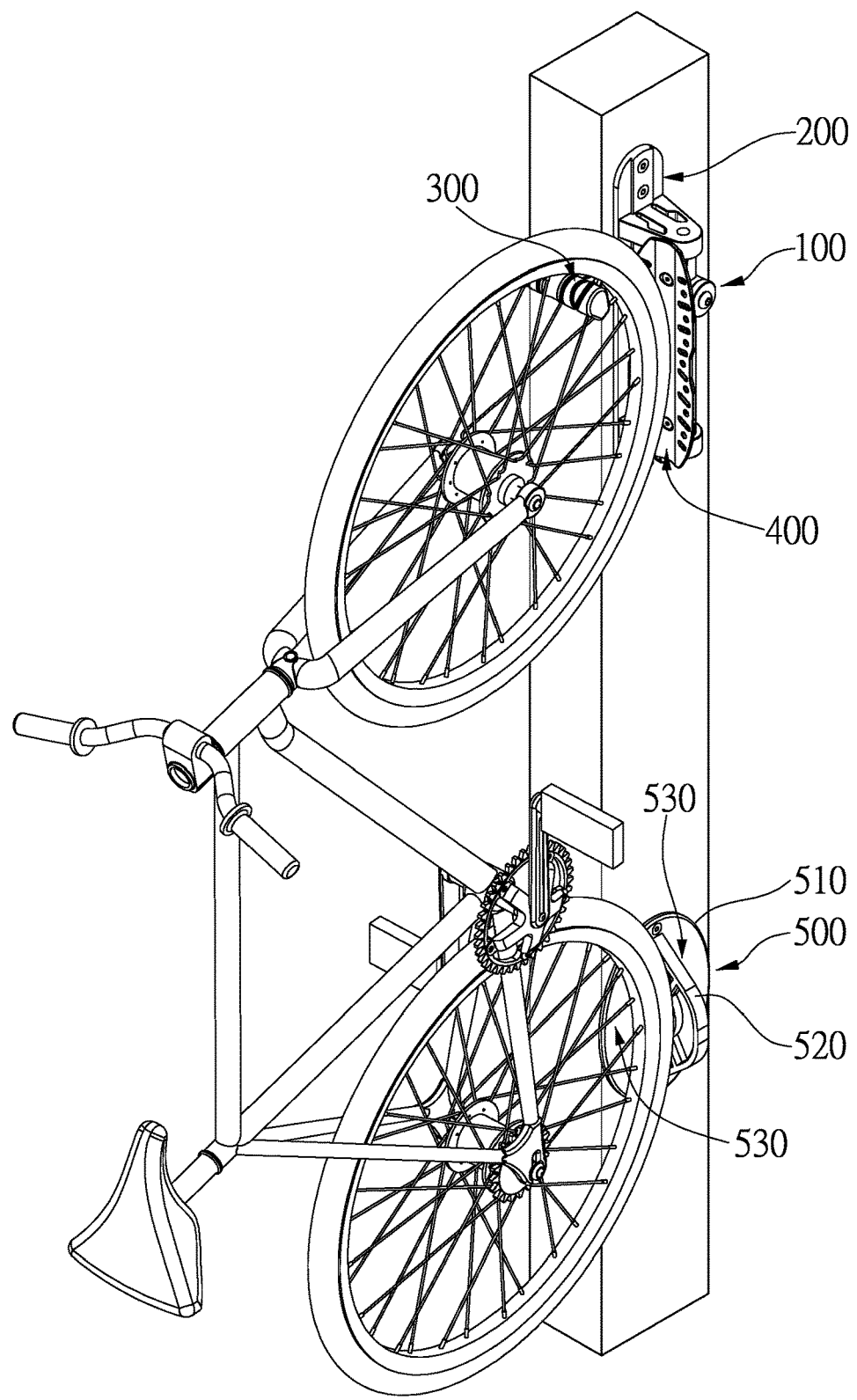
FIG. 6 shows that a bicycle is positioned to the wall mounted bicycle rack of the present invention from another direction.

A stop unit 500 is also be used with the bicycle rack 100 as shown in FIGS. 4 to 6, wherein the stop unit 500 is located at a distance from the base 200 and includes a base plate 510 and a stop 520 that extends from the base plate 510. A contact area 530 is formed between two sides of the stop 520 and the base plate 510 so that the rear wheel is located in the contact area 530 and stopped against the stop 520. Therefore, the axle 210 can be pivoted relative to the base 200 to adjust the orientation of the contact plate 400, and the rear wheel of the bicycle is stopped by the stop 520.

Figure 7:
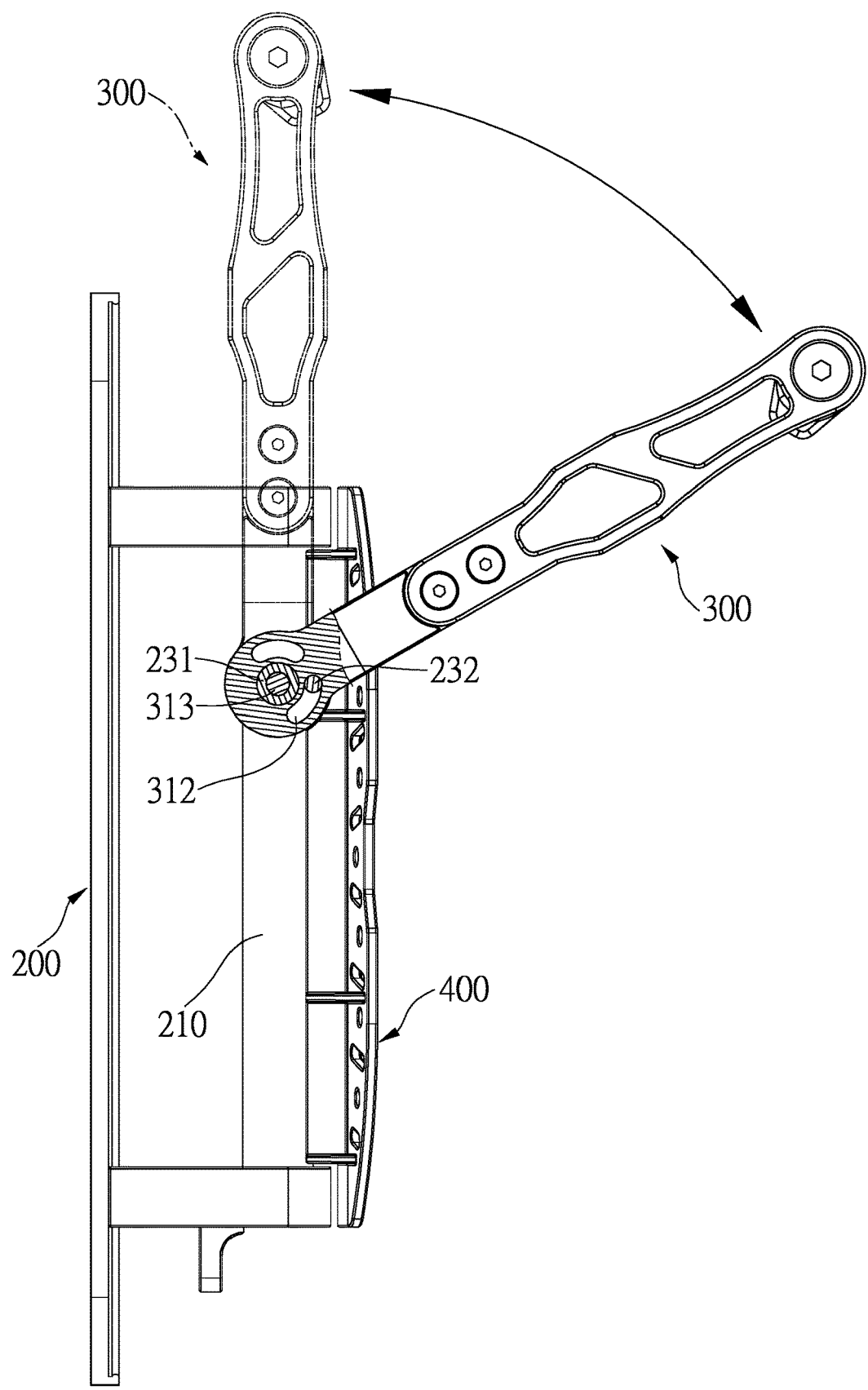
FIG. 7 shows that the hook unit is pivoted relative to the base.

The first end 220 of the portion of the axle 210 includes a first protrusion 222 protruding therefrom, and the first protrusion 222 is located offset from the center of the first pivot 221. The second end 230 of the portion of the axle 210 includes a second protrusion 232 protruding therefrom, and the second protrusion 232 is located offset from the center of the second pivot 231. The shank 310 includes two curve slots 312 which are respectively located corresponding to the first and second protrusions 222, 232. As shown in FIGS. 2, 3 and 7, when the bicycle rack 100 is not in use, the hook unit 300 is pivoted upward about the passage 311. As shown in FIG. 7, for example, when the shank 310 is connected to the second pivot 231, the shank 310 is pivoted upward as shown by dotted lines, to a neutral position to save space. The hook unit 300 does not protrude from the wall to avoid from being hit by people. The hook unit 300 can be switched an angle and positioned by engaging the first pivot 221 or the second pivot 231 relative to any one of two inner ends of the curve slots 312.

As shown in FIGS. 2 and 3, a cover 240 can be used to be mounted to the first end 220 or the second end 230 of the portion of the axle 210 so as to hide the first protrusion 222 or the second protrusion 232. Specifically, when the hook unit 300 is connected to the first pivot 221, the cover 240 is mounted to the second end 230 to keep the second end from exposure to outside.

Figure 8:
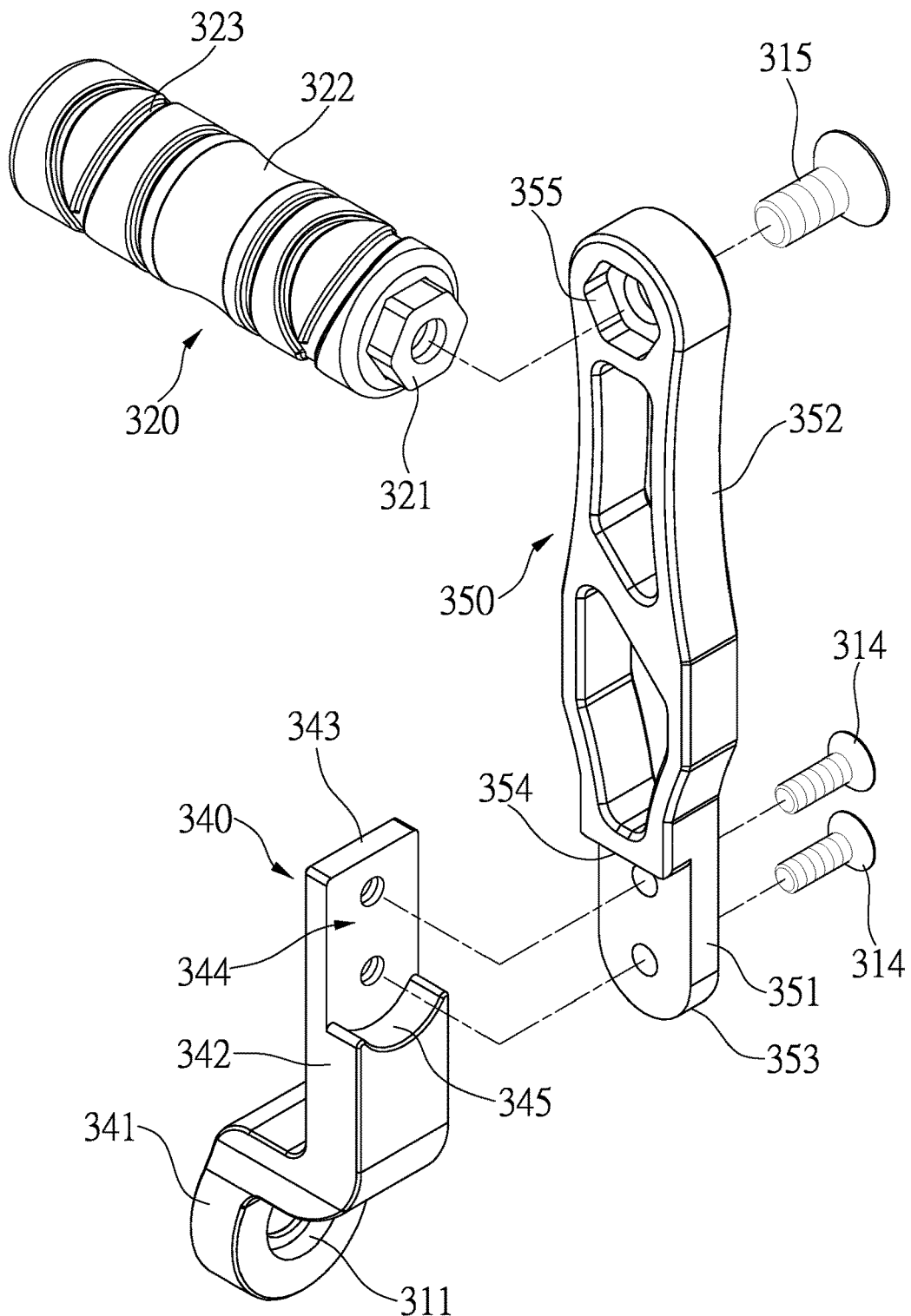
FIG. 8 is an exploded view of the hook unit.

As shown in FIGS. 2, 3 and 8, the shank 310 includes a first section 340 and a second section 350. The first section 340 includes an extension 341 and a bent portion 342 which is formed with the extension 341. The passage 311 and the curve slots 312 are defined in the extension 341. A first bolt 313 extends through the extension 341 and is connected to the first pivot 221 or the second pivot 231. The bent portion 342 includes a first surface 343 formed to the distal end thereof. A recessed area 344 is formed in one side of the extension 340. The recessed area 344 includes a first curve face 345. The second section 350 includes a tongue 351 and a body 352 which is formed with the tongue 351. The tongue 351 includes a second curve face 353 which is matched with the first curve face 345. A second surface 354 is formed between the tongue 351 and the body 352. The second surface 354 is matched with the first surface 343. The tongue 351 is located in the recessed area 344, and multiple second bolts 314 extend through the tongue 351 and are connected to the bent portion 342. The body 352 includes a polygonal recess 355 defined in one side thereof. The arm 320 includes a polygonal end 321 extending therefrom. The polygonal end 321 is engaged with the polygonal recess 355. A third bolt 315 extends through the body 352 and is connected to the polygonal end 321. By the engagement between the first and second curve faces 345, 353, and between the first surface 343 and the second surface 354, the first section 340 and the second section 350 are stably combined together. The arm 320 is not rotated relative to the body 352 by the engagement between the polygonal end 321 and the polygonal recess 355.

Figure 9:
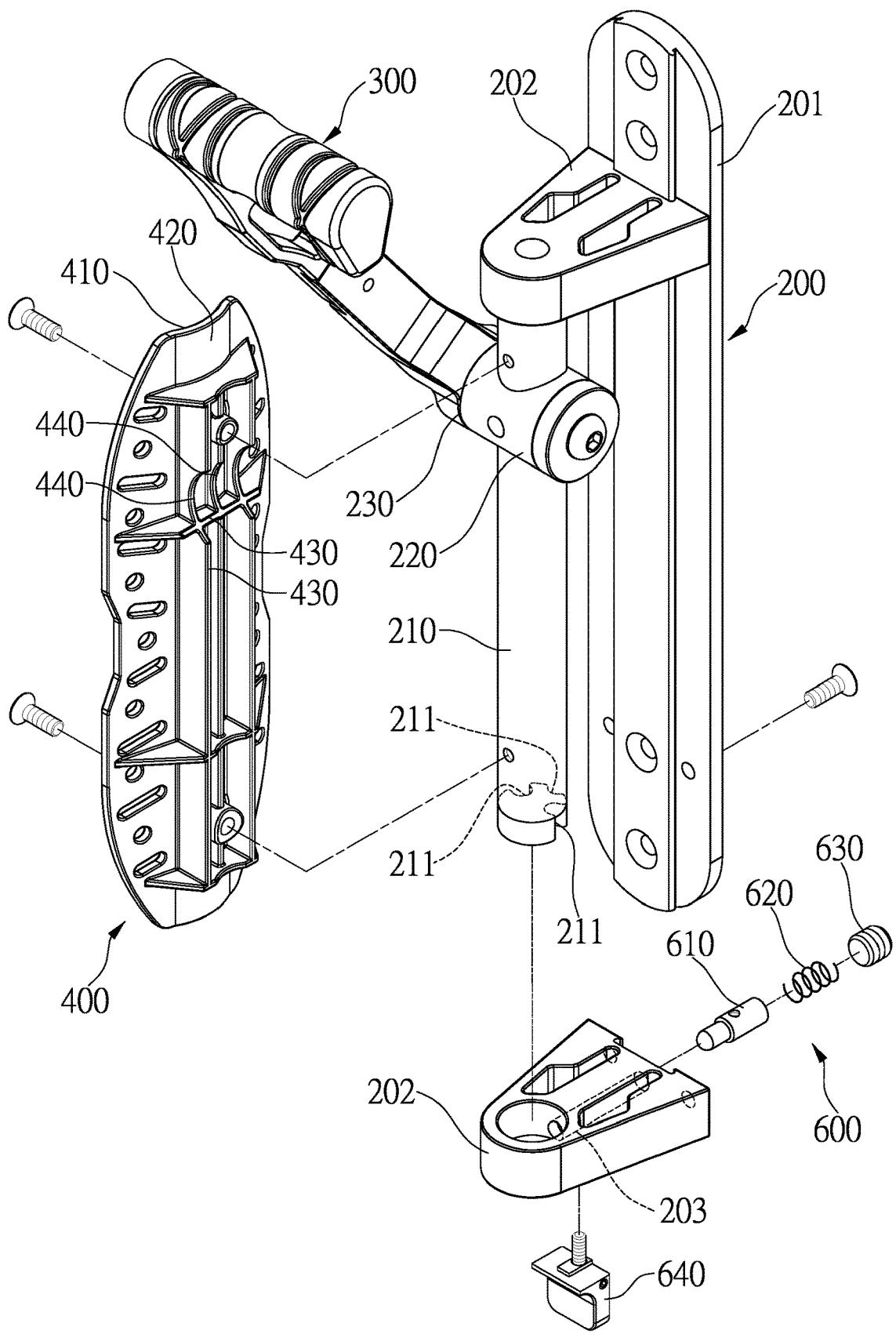
FIG. 9 shows one of the lug of the base is cooperated with a securing unit.
Figure 10:
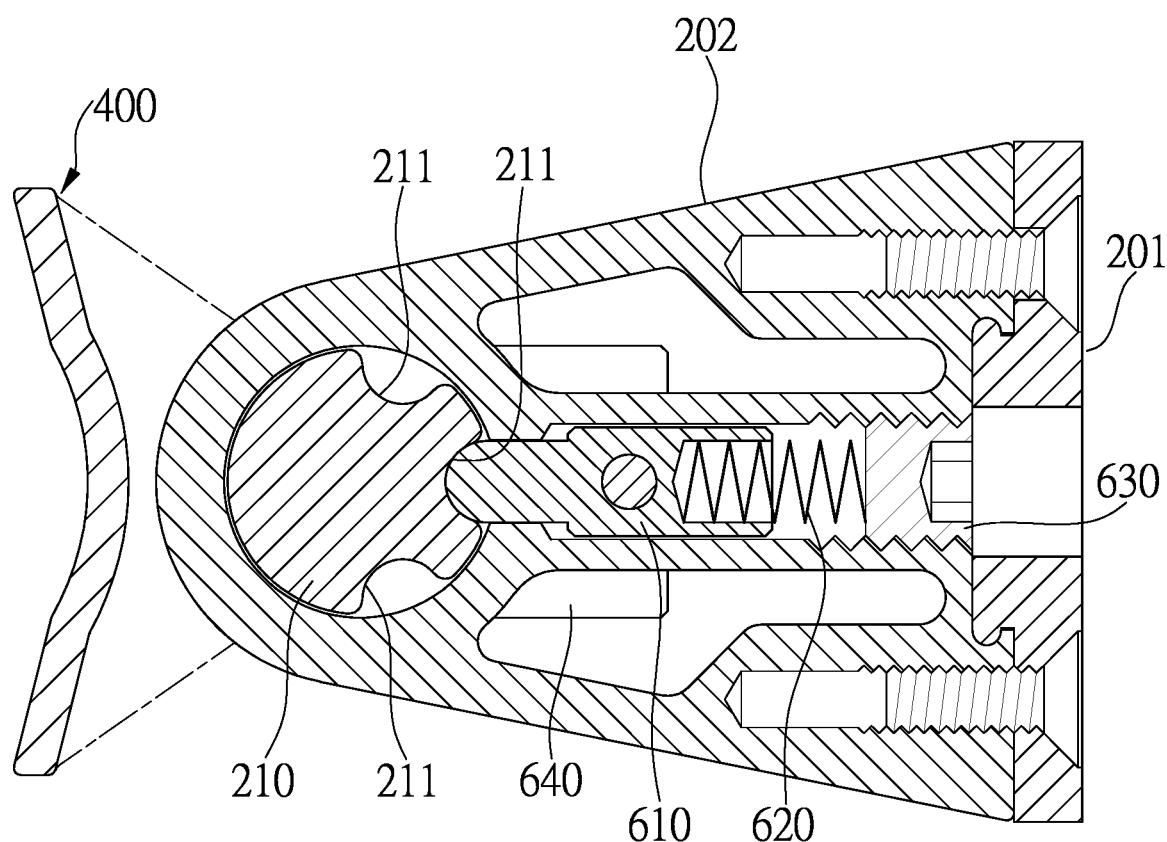
FIG. 10 is across sectional view, taken along line X-X of FIG. 1.

As shown in FIGS. 9 and 10, the base 200 includes a board 201 and two lugs 202 that extend from the board 201. The axle 210 is pivotably connected between the two lugs 202. Besides, a securing unit 600 is connected to a hole 203 defined in one of the two lugs 202. The securing unit 600 including a rod 610, a spring 620, an end piece 630 and a knob 640. The rod 610 and the spring 620 received in the hole 203, and the end piece 630 is connected to the hole 203 to seal the hole 203. The spring 620 is biased between the end piece 630 and the rod 610 so that one end of the rod 610 protrudes beyond the hole 203 and is engaged with one of multiple notches 211 defined radially in the axle 210. The knob 640 extends through the lug 202 that has the hole 203 and is connected to the rod 610 in the hole 203.

The rod 610 is pushed by the spring 620 to be engaged with one of the notches 211 of the axle 210 so that the axle 210 does not spin. When moving the knob 640 toward the end piece 630, the rod 610 is moved and the spring 620 is compressed, so that the rod 610 is removed from the notch 211, and the axle 210 is able to rotate relative to the lug 202. When the rod 610 is not pushed by the knob 640, the rod 610 is engaged with one of the notches 211 again.

As shown in FIG. 8, the arm 320 includes a serrated outer surface 323 which is divided into two groups by a groove 322 defined in the outer periphery of the middle portion of the arm 320. The protruded portion of the rim of a bicycle wheel is engaged with the groove 322. The serrated outer surface 323 further provide extra friction for the bicycle wheel with wider rim.

As shown in FIG. 9, the contact plate 400 includes a first side 410 and a second side 420 which is located opposite to the first side 410. The second side 420 includes multiple ribs 430 extending therefrom. The ribs 430 includes longitude ribs and altitude ribs, wherein at least one portion of the ribs 430 includes a yield recess 440 to accommodate the first end 220, the second end 230 and the axle 210 when the contact plate 400 is connected to eh axle 210.

While we have shown and described the embodiment in accordance with the present invention, it should be clear to those skilled in the art that further embodiments may be made without departing from the scope of the present invention.

What is claimed is:

1. A wall mounted bicycle rack (100) comprising:
a base (200) having an axle (210) pivotably connected thereto, the axle (210) including a portion which includes a first end (220) and a second end (230) that is located opposite to the first end (220), the first end (220) including a first pivot (221) extending therefrom, the second end (230) including a second pivot (231) extending therefrom;
a hook unit (300) including a shank (310) and an arm (320), the shank (310) including a passage (311) defined in a first end thereof so as to be connected to the first pivot (221) or the second pivot (231), the arm (320) extending laterally from a second end of the shank (310) so that an entrance (330) is formed between the arm (310) and the shank (310), the entrance (330) being opened toward a left side or a right side of the base (200), and
a contact plate (400) connected to the axle (210) and located between the first end (220) and the second end (230).

2. The wall mounted bicycle rack as claimed in claim 1, wherein the first end (220) of the portion of the axle (210) includes a first protrusion (222) protruding therefrom, the first protrusion (222) is located offset from a center of the first pivot (221), the second end (230) of the portion of the axle (2101 includes a second protrusion (2321 protruding therefrom, the second protrusion (232) is located offset from a center of the second pivot (231), the shank (310) includes two curve slots (312) which are respectively located corresponding to the first and second protrusions (222, 232).

3. The wall mounted bicycle rack as claimed in claim 2 further comprising a cover (240) which is mounted to the first end (220) or the second end (230) of the portion of the axle (210) so as to hide the first protrusion (222) or the second protrusion (232).

4. The wall mounted bicycle rack as claimed in claim 2, wherein the shank (310) includes a first section (340) and a second section (350), the first section (340) includes an extension (341) and a bent portion (342) which is formed with the extension (341), the passage (311) and the curve slots (312) are defined in the extension (341), a first bolt (313) extends through the extension (341) and is connected to the first pivot (221) or the second pivot (231), the bent portion (342) includes a first surface (343) formed to a distal end thereof, a recessed area (344) is formed in one side of the extension (340), the recessed area (344) includes a first curve face (345), the second section (350) includes a tongue (351) and a body (352) which is formed with the tongue (351), the tongue (351) includes a second curve face (353) which is matched with the first curve face (345), a second surface (354) is formed between the tongue (351) and the body (352), the second surface (354) is matched with the first surface (343), the tongue (351) is located in the recessed area (344), multiple second bolts (314) extend through the tongue (351) and are connected to the bent portion (342), the body (352) includes a polygonal recess (355) defined in one side thereof, the arm (320) includes a polygonal end (321) extending therefrom, the polygonal end (321) is engaged with the polygonal recess (355), a third bolt (315) extends through the body (352) and is connected to the polygonal end (321).

5. The wall mounted bicycle rack as claimed in claim 1, wherein the base (200) includes a board (201) and two lugs (202) that extend from the board (201), the axle (210) is pivotably connected between the two lugs (202).

6. The wall mounted bicycle rack as claimed in claim 5 further comprising a securing unit (600) connected to a hole (203) defined in one of the two lugs (202), the securing unit (600) including a rod (610), a spring (620), an end piece (630) and a knob (640), the rod (610) and the spring (620) received in the hole (203), the end piece (630) connected to the hole (203) to seal the hole (203), the spring (620) biased between the end piece (630) and the rod (610) so that an end of the rod (610) protrudes beyond the hole (203) and is engaged with one of multiple notches (211) defined radially in the axle (210), the knob (640) extending through the lug (202) having the hole (203) and contacting the rod (610) in the hole (203).

7. The wall mounted bicycle rack as claimed in claim 1, wherein the arm (320) includes a serrated outer surface (323) which is divided into two groups by a groove (322) defined in an outer periphery of a middle portion of the arm (320).

8. The wall mounted bicycle rack as claimed in claim 1, wherein the contact plate (400) includes a first side (410) and a second side (420) which is located opposite to the first side (410), the second side (420) includes multiple ribs (430) extending therefrom, the ribs (430) includes longitude ribs and altitude ribs, at least one portion of the ribs (430) includes a yield recess (440) to accommodate the first end (220), the second end (230) and the axle (210).

* * * * *